(12) United States Patent
Mahrt et al.

(10) Patent No.: US 11,438,655 B2
(45) Date of Patent: Sep. 6, 2022

(54) GEO-FENCING OF MEDIA CONTENT USING DISTRIBUTION AREAS IN A DATABASE

(71) Applicant: HULU, LLC, Santa Monica, CA (US)

(72) Inventors: Dallas Mahrt, Seattle, WA (US); Brandon Lonac, Edmonds, WA (US); Hank Hwang, Los Angeles, CA (US); Stephen Brown, Santa Monica, CA (US); William Daly, Santa Monica, CA (US); Yingan Wang, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 3 days.

(21) Appl. No.: 16/990,715

(22) Filed: Aug. 11, 2020

(65) Prior Publication Data

US 2020/0374587 A1    Nov. 26, 2020

Related U.S. Application Data

(63) Continuation of application No. 15/627,172, filed on Jun. 19, 2017, now Pat. No. 10,779,038.

(51) Int. Cl.
| | |
|---|---|
| *H04N 21/45* | (2011.01) |
| *H04N 21/44* | (2011.01) |
| *H04N 21/435* | (2011.01) |
| *H04N 21/258* | (2011.01) |
| *H04N 21/266* | (2011.01) |
| *H04N 21/658* | (2011.01) |

(52) U.S. Cl.
CPC ... *H04N 21/4524* (2013.01); *H04N 21/25841* (2013.01); *H04N 21/266* (2013.01); *H04N 21/435* (2013.01); *H04N 21/44* (2013.01); *H04N 21/6581* (2013.01)

(58) Field of Classification Search
None
See application file for complete search history.

(56) References Cited

U.S. PATENT DOCUMENTS

| | | |
|---|---|---|
| 7,877,767 B2 | 1/2011 | Jankins et al. |
| 8,666,989 B1 | 3/2014 | Gilliam et al. |
| 9,445,231 B2 * | 9/2016 | Florins ................. H04W 4/021 |

(Continued)

OTHER PUBLICATIONS

International Search Report and Written Opinion for International Applin. No. PCT/US20118/038023 dated Oct. 10, 2018, 13 pages.

(Continued)

*Primary Examiner* — Omar S Parra
(74) *Attorney, Agent, or Firm* — Kwan & Olynick LLP

(57) ABSTRACT

In some embodiments, a method receives a plurality of distribution areas. A distribution area is defined by one or more geographic primitives and associated with a distribution area identifier. Also, a geographic primitive is defined by one or more location identifiers. The method stores distribution area identifiers for the plurality of distribution areas in a first data structure. Information for media content is received and the method generates a content bundle for the media content based on the information for the media content. The content bundle is associated with a distribution area identifier and metadata that describes characteristics of the media content. The content bundle is stored in a second data structure.

20 Claims, 11 Drawing Sheets

(56) References Cited

U.S. PATENT DOCUMENTS

| | | |
|---|---|---|
| 2006/0041560 A1 | 2/2006 | Forman et al. |
| 2011/0041147 A1 | 2/2011 | Piepenbrink et al. |
| 2012/0159542 A1 | 6/2012 | Minwalla |
| 2013/0117120 A1 | 5/2013 | Shafiee |
| 2013/0205339 A1* | 8/2013 | Haberman ....... H04N 21/44204 725/35 |
| 2013/0220539 A1 | 8/2013 | Haberman et al. |
| 2013/0263182 A1 | 10/2013 | Ivy et al. |
| 2016/0269791 A1 | 9/2016 | Laczynski et al. |
| 2016/0373794 A1 | 12/2016 | Heitlinger et al. |
| 2017/0150321 A1 | 5/2017 | Ciecko |
| 2018/0367853 A1 | 12/2018 | Mahrt |
| 2018/0367854 A1 | 12/2018 | Mahrt |

OTHER PUBLICATIONS

European Patent Office, Extended European Search Report for 18821052.0 dated Dec. 7, 2020, 10 pages.

\* cited by examiner

GEO-FENCING OF MEDIA CONTENT USING DISTRIBUTION AREAS IN A DATABASE

CROSS REFERENCE TO RELATED APPLICATIONS

This application is a continuation application and, pursuant to 35 U.S.C. § 120, is entitled to and claims the benefit of earlier filed application U.S. application Ser. No. 15/627,172 filed Jun. 19, 2017, the content of which is incorporated herein by reference in its entirety for all purposes.

BACKGROUND

Media content, especially live media content, has very specific geographical areas where the content can be distributed and viewed. To ensure that the media content is properly distributed, geo-fencing techniques may be used that restrict media content to certain geo-location values (e.g., geographical areas) that can differ on a per-program basis.

In one example, for every piece of media content, the geo-fencing techniques associate a geography type and a set of valid values where the media content could be distributed. For a piece of media content, there may be a large set of values, such as upwards of 40,000 values, for the geo-location restrictions. This means that the video delivery service may have to create 40,000+ rows in a database for every piece of media content the video delivery service offers. Because the video delivery service may receive new pieces of media content almost every hour, the process of generating that many rows in the database may become a large job and also use a large amount of storage. Further, given the large amount of values, it is difficult to know when the set of available geo-location values changes for a piece of media content.

DETAILED DESCRIPTION

Described herein are techniques for a geo-fencing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments define a set of geographic primitives. The geographic primitives represent namable areas that can be defined by a specific geography. Then, a set of distribution areas is generated where a distribution area is defined by one or more of the geographic primitives. A unique identifier is assigned to each distribution area. Media content, such as media programs, are then assigned to one of the distribution areas. In one embodiment, a discreet piece of media content is assigned to a single distribution area. Then, when the video delivery service needs to determine which media content is available to a user, the video delivery service determines where a client device and a user are located. Then, the video delivery service maps the location to a specific set of geographic primitives. Once the set of geographic primitives is determined, the video delivery service performs a reverse lookup query to a database to identify all the distribution areas that contain these primitives. This provides a list of all distribution areas for the user based on the user's location. Once the distribution areas for a user are determined, the video delivery service can check whether a piece of media content is available by determining if the distribution area identifier for the media content is in the list of distribution areas for the user. If there is a match, then the piece of media content is available to that user.

The above process significantly reduces the number of values that needs to be published for each piece of media content. This in turn reduces the amount of storage needed. Also, the process simplifies geographic lookups to comparing one value (e.g., the distribution area associated with a piece of media content) among a small set of the distribution areas. This reduces the complexity of the query needed and reduces the processing time of the query.

Overview

Figure 1:
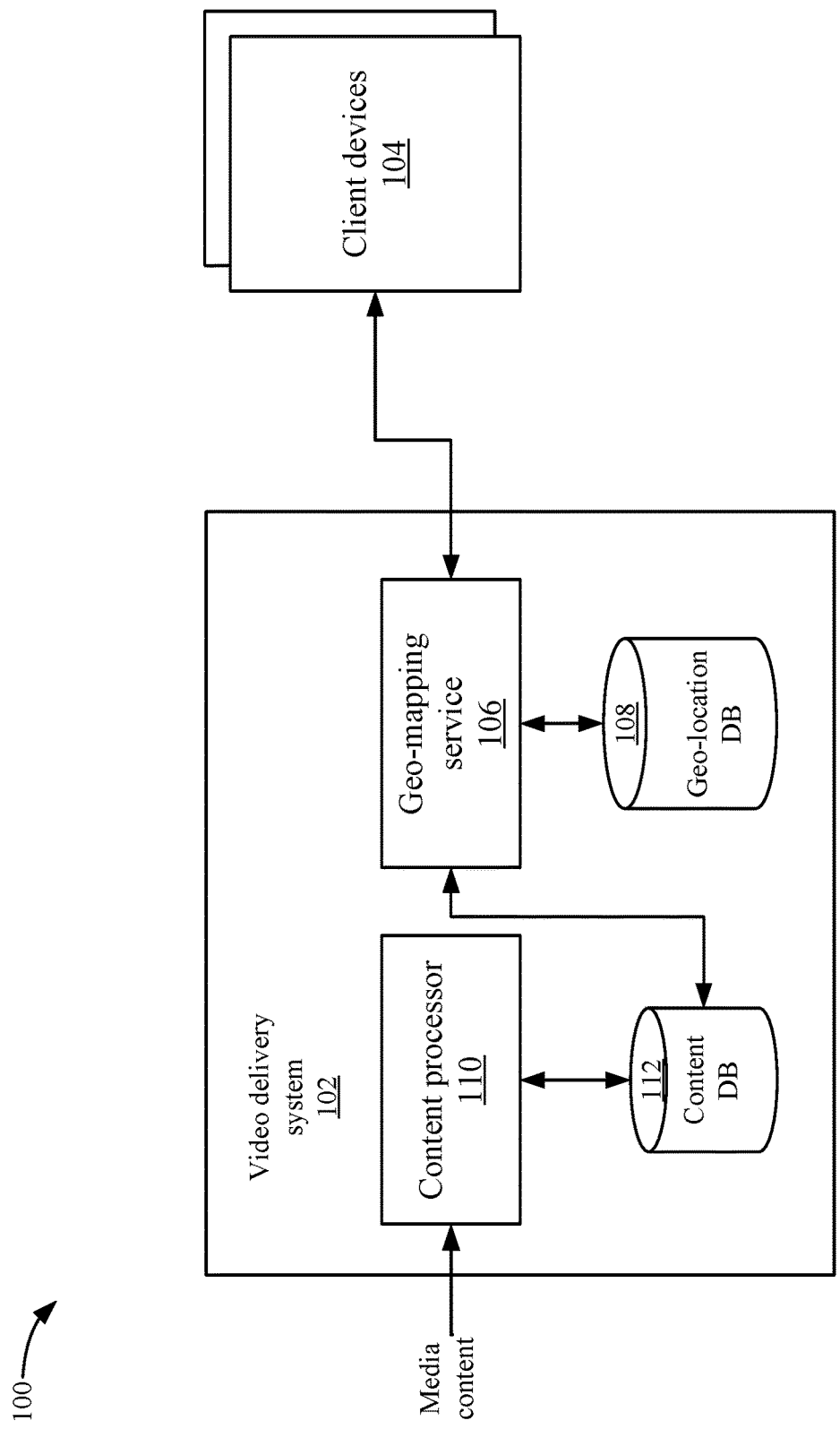
FIG. 1 depicts a simplified system for performing geo-fencing according to one embodiment.

FIG. 1 depicts a simplified system 100 for performing geo-fencing according to one embodiment. Geo-fencing is the enforcement of geo-location restrictions on media content. System 100 includes a video delivery system 102 and client devices 104. Video delivery system 102 may be operated by a video delivery service that provides media content to client devices 104. The content may be viewed on-demand or live, and may include different programs, such as television shows, sporting events, movies, and other content. Media content may be broken up into specific programs, which are a unit or piece of media content (e.g., an episode of a television show). When the term "media content" is used, this may mean a discreet piece of media content.

Client devices 104 may be user devices that can request and play media content using a media player. Also, client devices 104 may display an interface that lists media content that is available, such as a television guide or recommended media content. Different users may use client devices 104 in different locations. For example, a first user may be using a living room device in a user's home. The living room device may not typically move locations. Also, a user may be using a mobile device that may be used in various locations where mobile devices may change their location often. Client devices 104 may be associated with a current geographic location. For example, a geographic location may be an Internet protocol (IP) address that identifies a location where client device 104 is located. Other location information may also be used, such as global positioning system (GPS) information.

Video delivery system 102 includes a geo-mapping service 106 that can perform geo-fencing for media content. For example, geo-mapping service 106 can determine which media content is available to client devices 104 based on the client's current location.

A geo-location database (DB) 108 stores distribution areas in database tables. A distribution area may be a composition of one or more geographic primitives, which represent namable areas that are defined by a specific geography. The primitives include countries, ZIP codes, time zones, states, cities, and other proprietary definitions, such as Nielsen Direct Marketing Areas (DMAs). Once the geographic primitives are defined, a distribution area can be created with one or more geographic primitives. Each distribution area in geo-location database 108 is assigned a unique identifier.

A content processor 110 receives media content from content providers that are available for distribution to client devices 104. Content processor 110 also receives geographic restrictions for the content. For example, some media content may only be distributed to a certain time zone, such as a live sporting event that may only be distributed in a local area in which the sporting event is played.

Content processors 110 generate content bundles in a content database (DB) 112 that describe the media content. The content bundles include a distribution area identifier that associates the content with a distribution area. In one embodiment, each content bundle is associated with only a single distribution area.

When geo-mapping service 106 needs to determine which media content is available to a client device 104, geo-mapping service 106 determines the physical location of client device 104. Then, geo-mapping service 106 maps the physical location to a set of geographic primitives. For example, the physical location may be mapped to a ZIP code. That zip code may then be mapped to a regional area, such as the East coast and, also, the country of the United States. Then, geo-mapping service 106 performs a reverse lookup query to geo-location database 108 to identify all distribution areas that include the primitives. The lookup finds a list of all distribution areas for the current location of client device 104. Once all the distribution areas for client device 104 are determined, geo-mapping service 106 can check which media content is available by determining if a distribution area identifier for the media content is in the list of distribution areas for the user. If media content includes a matching distribution area identifier, then that media content is made available for that user.

In one embodiment, geo-mapping service 106 can perform a query to content database 112 to select which content bundles have eligible distribution area identifiers in the list of distribution areas. The above process significantly reduces the number of values that need to be published for each piece of media content. For example, only one distribution area identifier is published instead of a list of all the ZIP codes, countries, etc. in which the media content may be available. Also, the use of distribution areas simplifies the geographic lookups by comparing one value to a small set of the list of distribution areas for client device 104. This is simpler than querying every piece of media content with multiple arguments, such as a geography type and a set of valid values where it is distributed. Also, previously, a large set of rows needed to be queried in the database, such as 40,000 rows for each piece of media content. Particular embodiments reduce the number of rows that need to be queried, which improves the processing time of video delivery system 102 to determine which media content is available to a user. In a real-time environment, such as when client devices 104 are navigating a user interface, and video delivery system 102 needs to dynamically determine which media content to display on the user interface, a quick processing time for queries is needed.

Geo-Location Database

Figure 2:
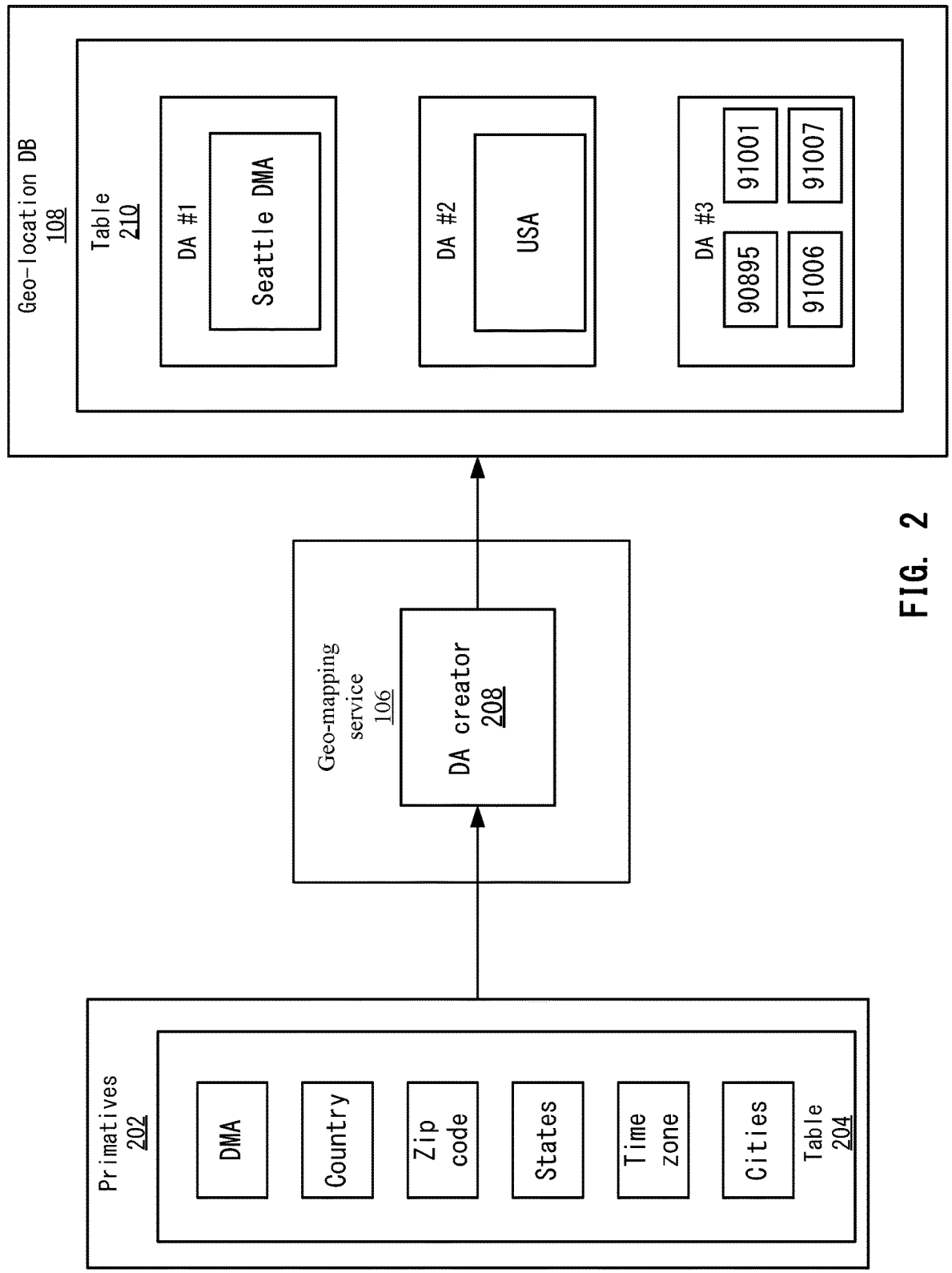
FIG. 2 shows an example of geographic primitives and distribution areas according to one embodiment.

FIG. 2 shows an example of geographic primitives and distribution areas according to one embodiment. Geographic primitives represent namable areas that can be defined as a specific geography. The geographic primitives can be defined using specific areas on a map or can be defined as a collection of other geographic primitives. For example, a time zone may be defined as a collection of ZIP codes. The geographic primitives can have their own area re-defined without altering the name of the area with which it is associated. Possible geographic primitives are shown at 202 and can be defined for geo-location database 108. Each geographic primitive may be associated with possible values. For example, values for ZIP codes may be every ZIP code possible in the United States. Similarly, the states may be every state in the United States.

Once the geographic primitives are defined with possible values, distribution areas may be defined using the geographic primitives in geo-location database 108. The distribution area is a logical collection of namable areas, not the specific geography that each primitive represents. For example, the distribution area is a composition of one or more geographic primitives. The concept of a distribution area allows video delivery system 102 to have an immutable definition of an area while allowing for minor variations in its physical geography. For example, if video delivery system 102 creates a distribution area that encompasses the Eastern and Central time zones, video delivery system 102 can alter which physical area each time zone contains, but the fact that media content is being distributed to the Eastern and Central time zones remain the same. For example, the Eastern time zone may change to include different locations, the definition of the Eastern time zone in the video delivery service does not need to change. Also, a county may have additional zip codes added or removed, or its geographical coordinates changed.

A distribution area (DA) creator 208 in geo-mapping service 106 may receive a definition for a distribution area and select values for geographic primitives 202 from table 204. For example, if a distribution area for the Seattle DMA is requested, distribution area creator 208 retrieves a value for the Seattle DMA and can store it in a table 210 for the new distribution area. The value for the Seattle DMA may be a proprietary definition of data for the Seattle area. In another embodiment, a collection of zip codes for a region may be stored in table 210 for a regional distribution area.

Distribution area creator 208 may assign a unique identifier for a created distribution area that can be used to reference the new distribution area. For example, distribution area creator 208 assigns the identifier "1" creating a new distribution area #1 that includes the Seattle DMA. In one embodiment, this definition may use a single row in a database to define the distribution area identifier, primitive type, and primitive value. It is possible another data structure may be used to define the distribution area in terms of other primitives, such as a DMA may be defined by a number of zip codes in another data structure. In another embodiment, the distribution area may be defined in a single data structure.

Additionally, distribution area creator 208 may create a second distribution area using the country value from table 204 of "USA". This country value designates any area in the United States. Distribution area creator 208 assigns this distribution area the identifier "2".

Distribution area creator 208 then creates a distribution area for a number of specific ZIP codes. Distribution area creator 208 may retrieve the ZIP code values from table 204 and store them in table 210 with a distribution area that is identified by "3". In this case, distribution area #3 may include four ZIP codes. This definition may use four rows in table 210 for the four zip codes.

Once distribution area creator 208 creates a distribution area, the collection of geographic primitives is immutable. That is, the geographic primitives that define the created distribution area cannot change. For example, if the distribution area is defined by the Seattle DMA, the primitive of "Seattle DMA" cannot be changed for that primitive. However, the primitives themselves may be redefined, such as by including a new zip code that would be included in the Seattle DMA. If video delivery system 102 needs to define a new distribution area with new primitives, distribution area creator 208 creates a new collection of geographic primitives and a new geographic area with a unique identifier. Even though the definition of a distribution area is immutable, the location that is encompassed by the distribution area may change. For example, the areas included in a time zone may change, but the time zone distribution area does not change.

Distribution area creator 208 may store the values in rows for table 210. The number of rows that are needed depends on the number of geographic primitives included in the distribution area. Storage is saved using the distribution areas because a specific distribution area only needs to be saved once. Conventionally, each piece of media content had to have a list of geographic identifiers saved even if the list was the same for another piece of content.

Content Database

Figure 3:
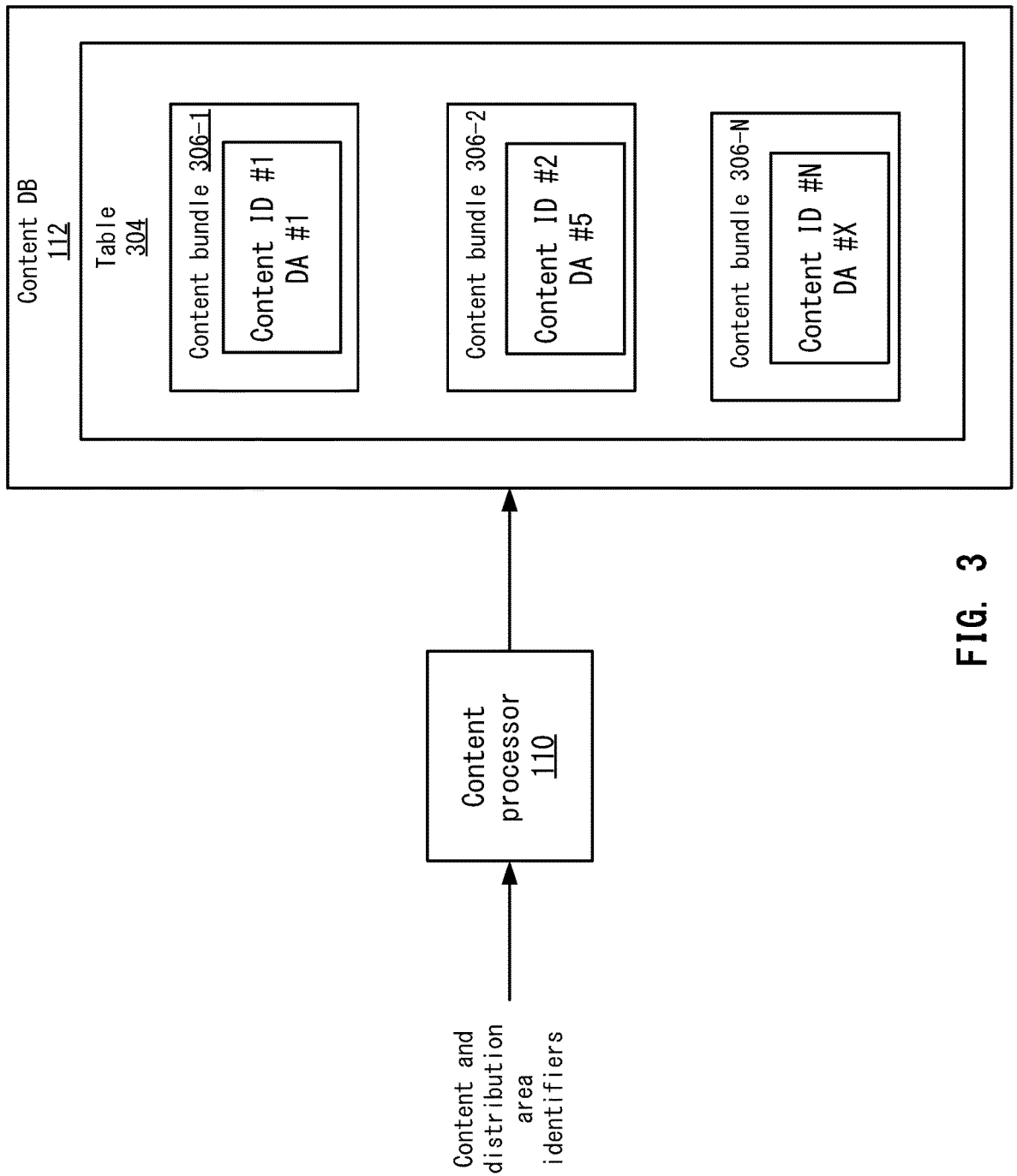
FIG. 3 depicts an example of creating content bundles according to one embodiment.

Media content that is available can be associated with a single distribution area identifier. The media content may be described using a content bundle that is created for the media content. FIG. 3 depicts an example of creating content bundles according to one embodiment. A content processor 110 may create content bundles for media content. The content bundle may include metadata that describes characteristics of the media content. One part of the content bundle may include a distribution area identifier that uniquely identifies the distribution area. In one embodiment, one content bundle may be associated with a single distribution area identifier. This means that this content can only be distributed to the single distribution area associated with the distribution area identifier. In another embodiment, a content bundle may be associated with multiple distribution area identifiers if the content is available in different ways. For example, a piece of content may be available in a distribution area #1 for users with a specific entitlement and the same content may be available in a distribution area #2 for users with an additional or different entitlement.

Content processor 110 may receive information for a piece of media content, such as a television show, and create a content bundle in a table 304 in content database 112. The information in table 304 for the content bundle may include the content identifier and also a distribution area identifier. For example, a content bundle 306-1 is for a first piece of media content with the content identifier #1. Also, the distribution area identifier of #1 has is assigned to this content bundle. Content processor 110 may select the distribution area identifier based on a source stream associated with the media content or other characteristics of the media content.

At 306-2, a content bundle with the identifier #2 is assigned the distribution area of DA #5. This means that this piece of media content may be distributed in distribution area #5. This process continues as other content bundles are created and assigned distribution areas such as content bundle #N is assigned to distribution area #X.

Accordingly, content processor 110 only assigns a single distribution area to a content bundle. This only requires one row in table 304. However, if multiple ZIP codes were associated with the piece of media content, then multiple rows would have been required for the ZIP codes for the media content without utilizing a distribution area. Using the distribution areas saves a large amount of storage space because the ZIP codes required for a distribution area are only stored once for the distribution area and not repeated for each piece of content for each content bundle stored in table 304. Rather, only a single distribution area identifier is stored for the media content. Once the distribution areas are defined and pieces of media content are associated with distribution area identifiers, the distribution areas can be used to determine which media content is available to users using client devices 104.

Geo-Mapping Service

Figure 4:
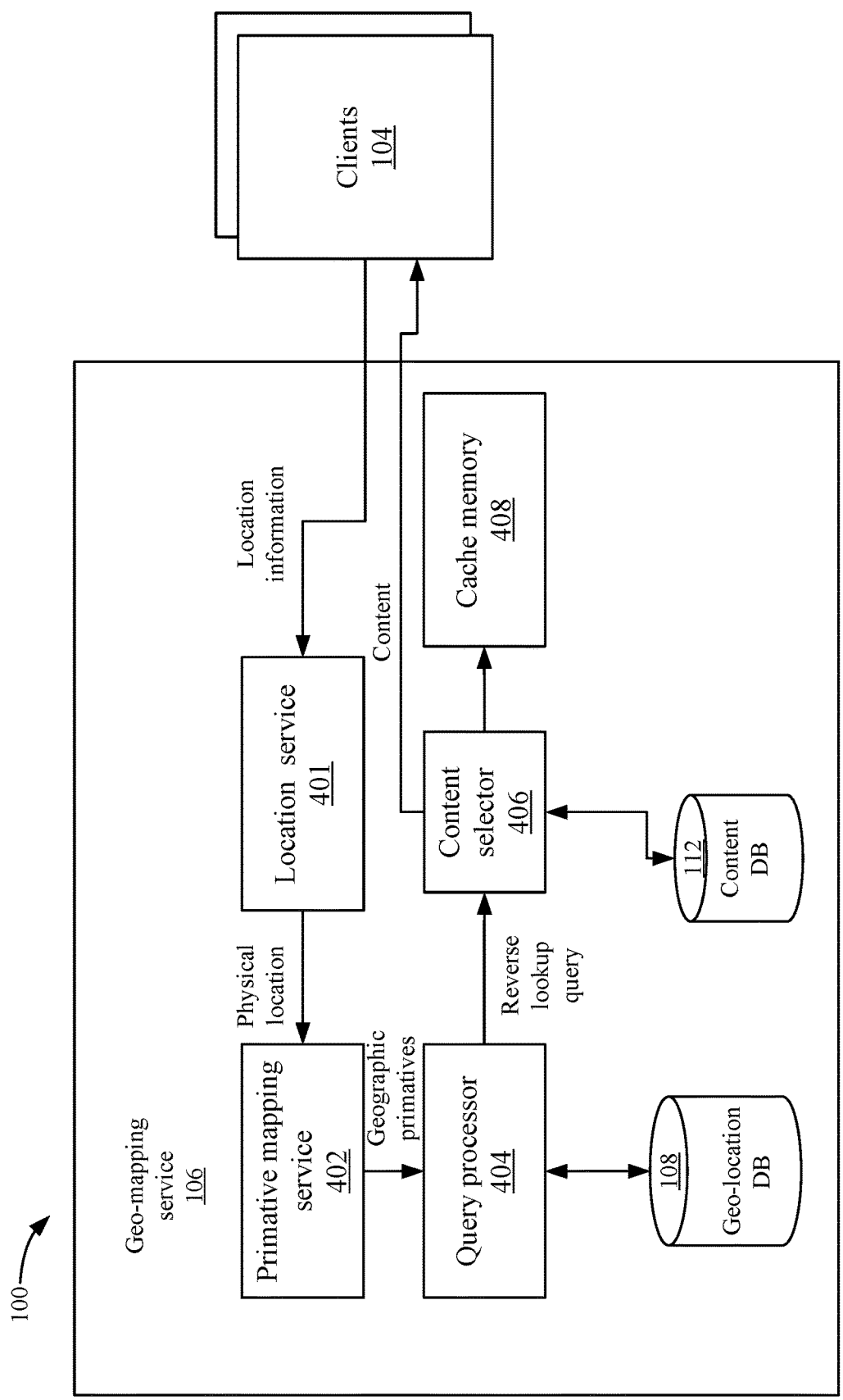
FIG. 4 depicts a more detailed example of a system for selecting which content is available to users according to one embodiment.

FIG. 4 depicts a more detailed example of system 100 for selecting which content is available to users according to one embodiment. Geo-mapping service 106 includes a location service 401, a primitive mapping service 402, a query processor 404, and a content selector 406. Location service 401 receives information where client device 104 is located. The location information may be received in a request from client device 104, such as a request for displaying a portion of a user interface or requesting playing of a piece of media content. This request may be received while the user is using the user interface in real-time. Location service 401 may also query client device 104 for the location information or receive the location information from client device 104 in other ways.

Location service 401 identifies a physical location of the user from the location information received from client device 104. For example, location service 401 may use the Internet protocol (IP) address for client device 104 to determine a physical location for client device 104. Additionally, device location services, such as global positioning system (GPS) coordinates, may also be used to determine the physical location for client device 104. The physical location may be determined in different formats, such as longitude/latitude coordinates, GPS coordinates, ZIP codes, or other formats that identify physical location.

Primitive mapping service 402 then maps the physical location of client device 104 to one or more geographic primitives. Primitive mapping service 402 may perform the mapping using geo-spatial datasets or other services that can map physical locations to the geographic primitives. A geo-spatial dataset includes data that has a geographic component to it. This means that the records in a dataset have locational information tied to them such as geographic data in the form of coordinates, address, city, or ZIP code. In one example, a set of GPS coordinates can be mapped to a ZIP code, a country, a DMA, and other geographic primitives using mappings in a geo-spatial dataset. Also, primitive mapping service 402 may take the resulting geographic primitives from the mapping and also find additional primitives that contain the primitive. For example, if a ZIP code is determined, then primitive mapping service 402 may determine the state and country that includes the ZIP code.

Once the set of geographic primitives are determined, a query processor 404 can query geo-location database 108 to identify all distribution areas that include the geographic primitives. In one embodiment, query processor 404 performs a reverse lookup query, which is a query that uses arguments for items that may be included in rows for the distribution areas rather than searching for a distribution area itself by the distribution area ID. In one embodiment, query processor 404 sends a query that includes arguments of the values for the geographic primitives. Geo-location database 108 returns any distribution area IDs that were associated with rows that included at least one of the values for the geographic primitives.

From the list of distribution areas, a content selector 406 can determine a list of distribution areas for the physical location of client device 104 and the user. For example, content selector 406 executes a query that includes the distribution area identifiers on content database 112. This may query for any rows that include the distribution area ID for a content bundle. Content database 112 returns any content bundles that are identified with the distribution area IDs. As discussed above, content bundles are associated with only a single distribution ID and there is no ambiguity that the content could be distributed to another distribution area.

Content selector 406 can then use the content bundles to identify media content that is available to client device 104. For example, if a page of the user interface is being generated for client device 104, the user interface may be populated with icons for the media content available in that user's location. In one embodiment, all of the media content may be displayed in the user interface. In another embodiment, a user may be navigating to different portions of the user interface, such as to television shows, movies, or further granularities, such as comedies. Content selector 406 may select a portion of the media content to display on the user interface, such as only content in the genre of comedy, that are available in that user's location.

In another embodiment, the request may have been for a specific piece of media content to play, such as a television show episode or movie. Content selector 406 may then determine if that media content includes a distribution area ID that is associated with the physical location of client device 104 before allowing client device 104 to play that media content.

Content selector 406 may cache the list of distribution areas for client device 104 and the user in a cache memory 408. The list of distribution areas may be cached for a long period of time because it may only change when the user changes location, which may not be frequent especially if a living room device is being used. Using cache memory 408, content selector 406 may not need to query content database 112 for a list of content bundles if the content bundles in content database 112 have not changed since the last query. However, a query to content database 112 may need to be performed if any information in content database 112 has changed, such as the distribution area identifier for an existing piece of media content has changed or a new piece of media content has been added. However, content selector 406 may not need to query every single row of content database 112, but rather only the changed rows of content database 112. This would reduce the processing time of the query and computing resources needed to process the query.

Also, the list of distribution areas in cache memory 408 may be used across multiple users. For example, if a second user is using a second client device 104 that is in a similar location of the first user (either the exact same physical location or a physical location that is within a geographical area encompassed by the primitive, such as ZIP code), then content selector 406 may not need to query content database 112 again if the content has not changed. Additionally, query processor 404 may not need to query geo-location database 108 to find the list of distribution areas either if the same geographic primitives are being used. However, if some distribution areas in geo-location database 108 have changed, then query processor 404 may need to perform a new query. The new query may be performed on only the changed rows in the table in geo-location database 108 or may be performed on the entire table.

Examples

Figure 5A:
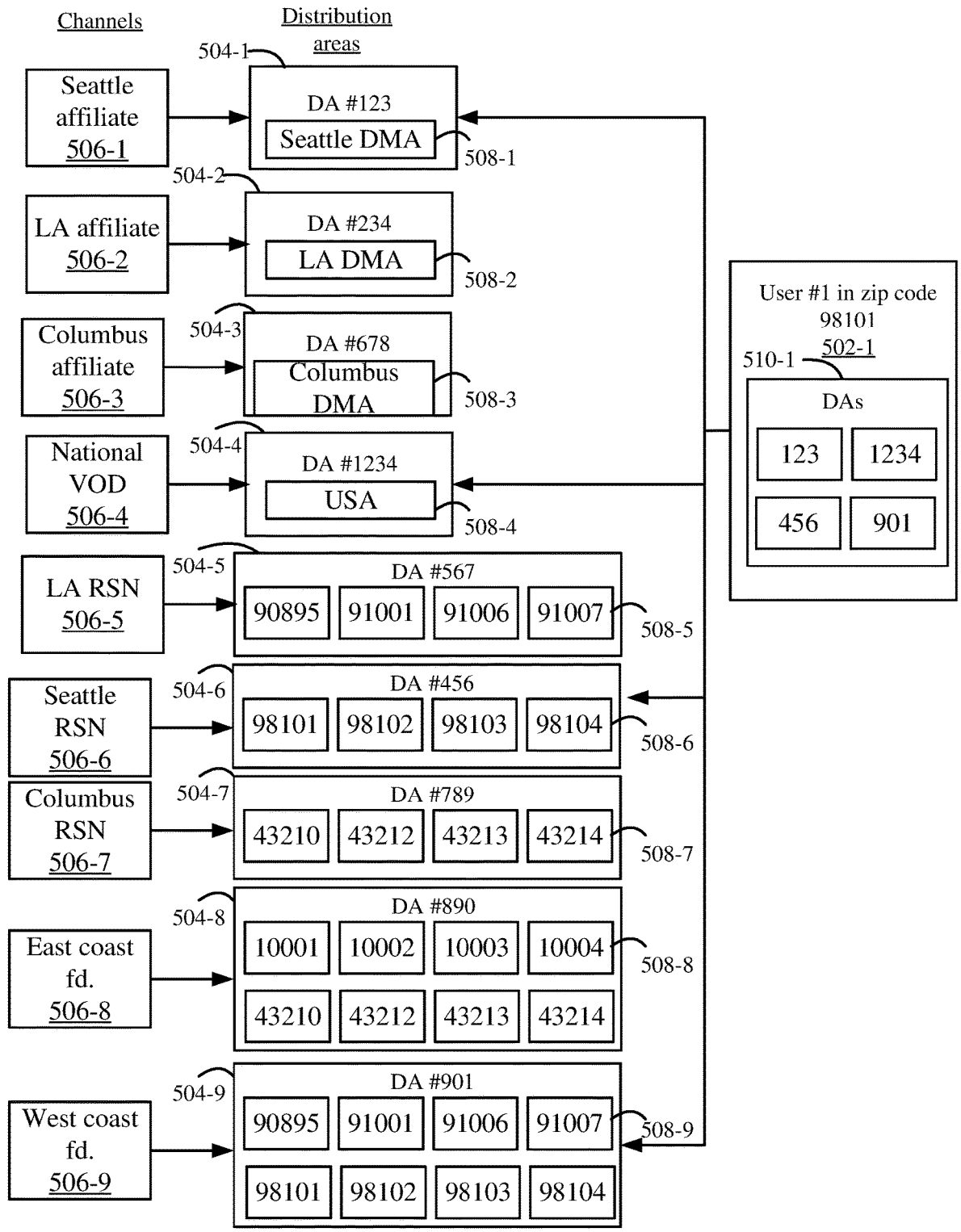
FIGS. 5A-5C show an overview of the selection process for distribution areas according to one embodiment.
Figure 5B:
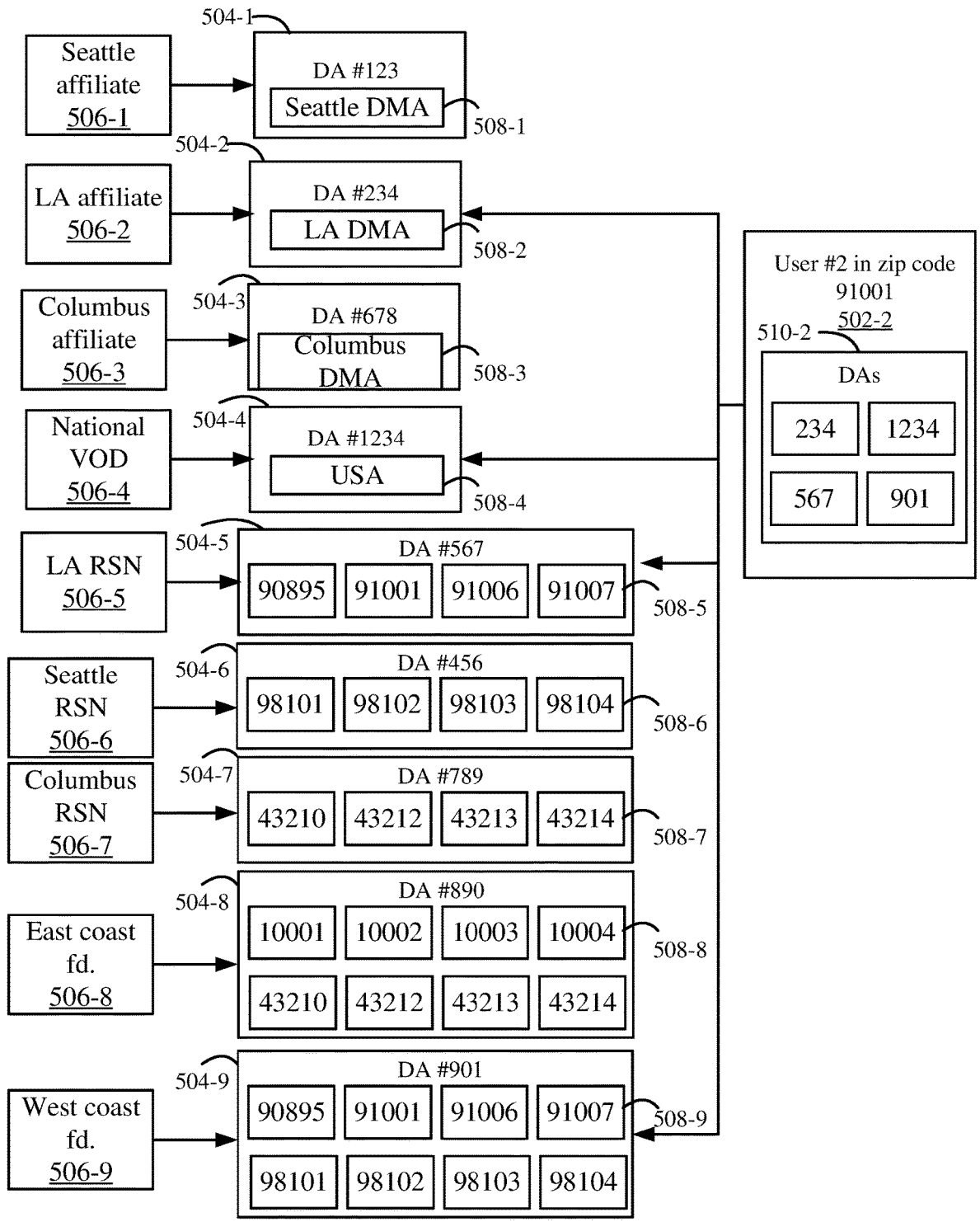
Figure 5C:
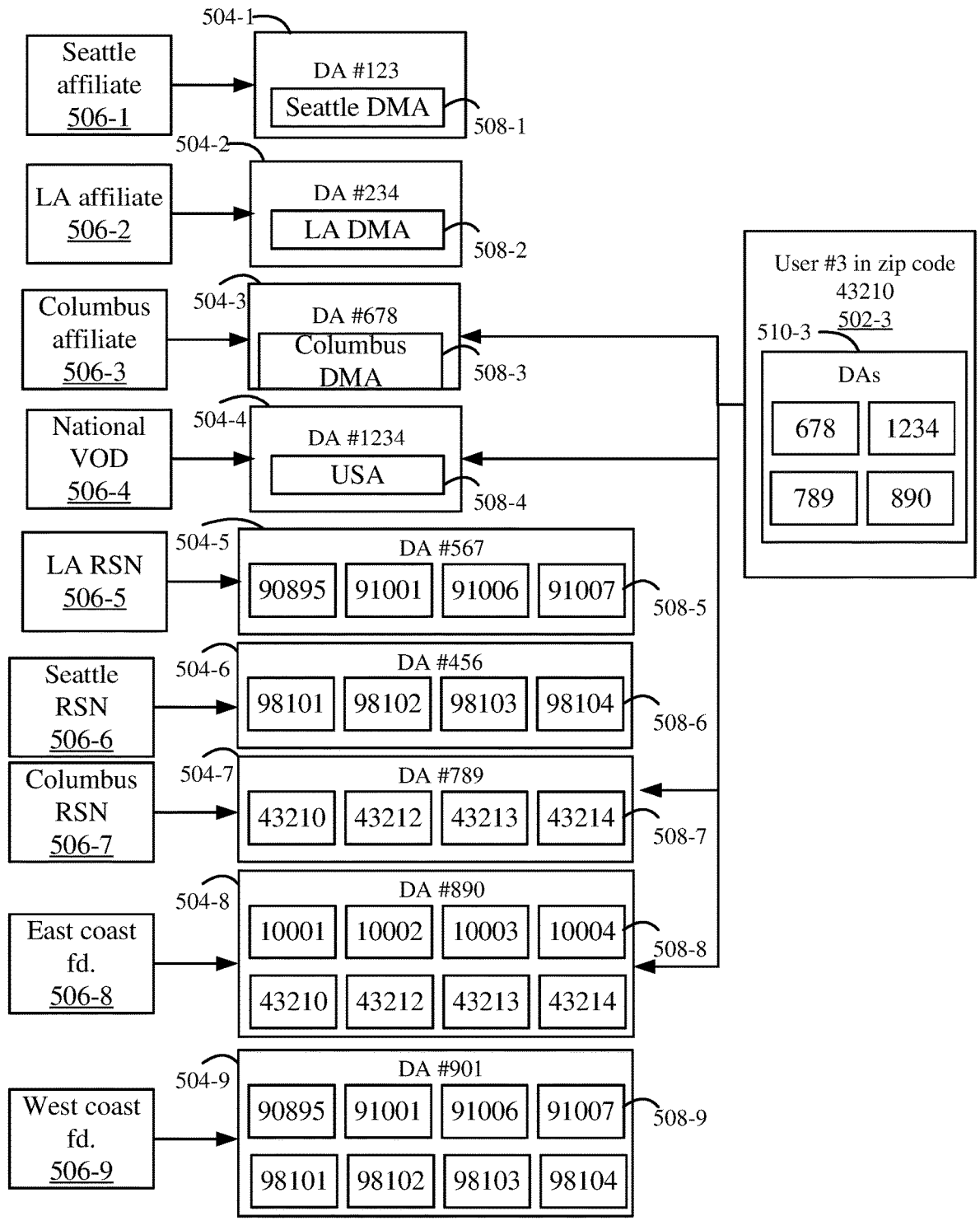

FIGS. 5A-5C show an overview of the selection process for distribution areas according to one embodiment. A first user at 502-1 may be in a ZIP code "98101". Query processor 404 can then determine distribution areas from that geographic primitive.

At 504-1-504-9, different distribution areas are shown with each having a unique identifier. For example, distribution areas of #123, #234, #678, #1234, #567, #456, #789, #890, and #901 are shown.

Each of the distribution areas may be associated with a channel. A channel may be a specific channel offered by video delivery system 102, and may be associated with a network. Various content for a channel may be associated with the same distribution area ID. For example, at 506-1, a Seattle affiliate channel may be associated with distribution area #123 at 504-1. Distribution area #123 is associated with a primitive of Seattle DMA at 508-1. This is the Seattle DMA geographic primitive. Similarly, at 506-2 and 506-3, a Los Angeles affiliate channel and a Columbus affiliate channel are associated with distribution areas #234 and #678, respectively. The geographic primitives are also DMAs, such as the Los Angeles DMA (LA DMA) at 508-2 and the Columbus DMA at 508-3.

A national video on-demand (VOD) channel may also be provided at 506-4. The national video on-demand may allow users to request videos on-demand at any time. In this case, distribution area #1234 at 504-4 is associated with the geographic primitive of the country "USA" at 508-4. In this case, the geographic restriction for on-demand content is the country of the United States.

Regional networks may also be associated with distribution areas. For example, the Los Angeles regional sports network (RSN) channel, the Seattle regional sports network channel, and the Columbus regional sports network channel are shown at 506-5, 506-6, and 506-7, respectively. These are regional sports channels that may be only provided to certain regions. For example, a distribution area #567 may specify ZIP codes for the Los Angeles region that apply at 508-5. Similarly, distribution area #456 for the Seattle region includes different ZIP codes for the Seattle region at 508-6 and distribution area #789 for the Columbus region includes different ZIP codes for the Columbus region at 508-7.

Regional channels may also be defined by distribution areas. The regional channels may provide distribution of media content for a larger region than a city, such as an East Coast feed (East coast fd.) channel and a West Coast feed (West coast fd.) channel. In this case, some media content may be designated for the East Coast and some media content may be designated for the West Coast. The East Coast feed channel is shown at 506-8 and the West Coast feed channel is shown at 506-9.

The regions may be defined by a list of zip codes, but other primitives to define the regions may be used. A distribution area #890 at 504-8 includes a first set of ZIP codes at 508-8, and a distribution area #901 at 504-9 includes a different set of ZIP codes at 508-9 for the West Coast. It will be noted that different additional ZIP codes may be included in the above distribution areas.

Each geographic primitive may be stored in a row of a table. For example, the distribution area #901 may include 8 rows that store the ZIP codes for the distribution area. It is possible that ZIP codes may be duplicated for different distribution areas. However, the ZIP codes do not need to be repeatedly stored for every single piece of media content.

At 502-1, a user is using a client device 104-1 that is determined to be a geographic primitive of "98101". Query processor 404 then performs a reverse lookup query to geo-location database 108 with an argument of "98101". This would return the distribution areas that include the ZIP code 98101. For example, distribution areas #123, #1234, #456, and #901 are returned. Although the ZIP code 98101 is not shown in distribution area #123 and distribution area #1234, the geographic primitive for those respective distribution areas would resolve to those distribution areas using the ZIP code 98101. In another embodiment, a latitude/longitude query against a geospatial database may be used to determine the distribution areas that include the geographic primitive.

Referring to FIG. 5B, at 502-2, a user #2 using a client device 104-2 is determined to be in the physical location associated with geographic primitive "91001". Query processor 404 performs a query using that ZIP code as an argument in the query. This returns distribution areas #234, #1234, #567, and #901. The ZIP code 91001 is in the Los Angeles region and thus applies to the LA regional sports channel in the West Coast feed in addition to the LA affiliate channel and national video on demand. The distribution areas are shown at 510-2 that match the geographic primitive of 91001.

Referring to FIG. 5C, a user #3 at 502-3 is using a client device 104-3 and is determined to be in a physical location associated with the geographic primitive of the ZIP code 43210. This may be in the Columbus area and query processor 404 processes a query with the argument of the ZIP code 43210 with the geographic primitive of 43210. This returns the distribution areas of #678, #1234, #789, and #890. These distribution areas are shown at 510-3 and are generally associated with distribution areas in the Columbus area.

Method Flows

Figure 6:
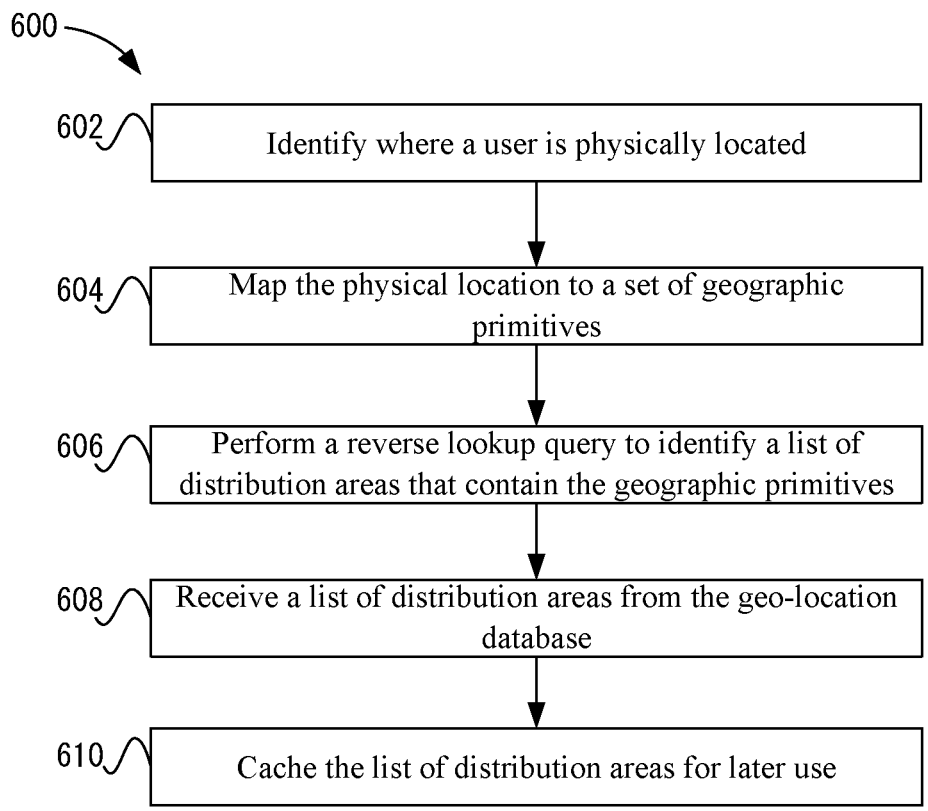
FIG. 6 depicts a simplified flowchart of a method for determining whether media content is available according to one embodiment.

The following will describe the overall process flow to determine media content that is available to a user based on the user's location. First, available distribution areas are determined. FIG. 6 depicts a simplified flowchart 600 of a method for determining whether media content is available according to one embodiment. At 602, geo-mapping service 106 identifies where a user is physically located. For example, location information from client device 104 may be received.

At 604, geo-mapping service 106 maps the physical location to a set of geographic primitives. The geographic primitives may include ZIP codes or other granularities of the geographic primitives.

At 606, geo-mapping service 106 performs a reverse lookup query to identify a list of distribution areas that contain the geographic primitives. The reverse lookup query is sent to geo-location database 108.

At 608, geo-mapping service 106 receives a list of distribution areas from geo-location database 108. At 610, geo-mapping service 106 caches the list of distribution areas for later use.

Figure 7:
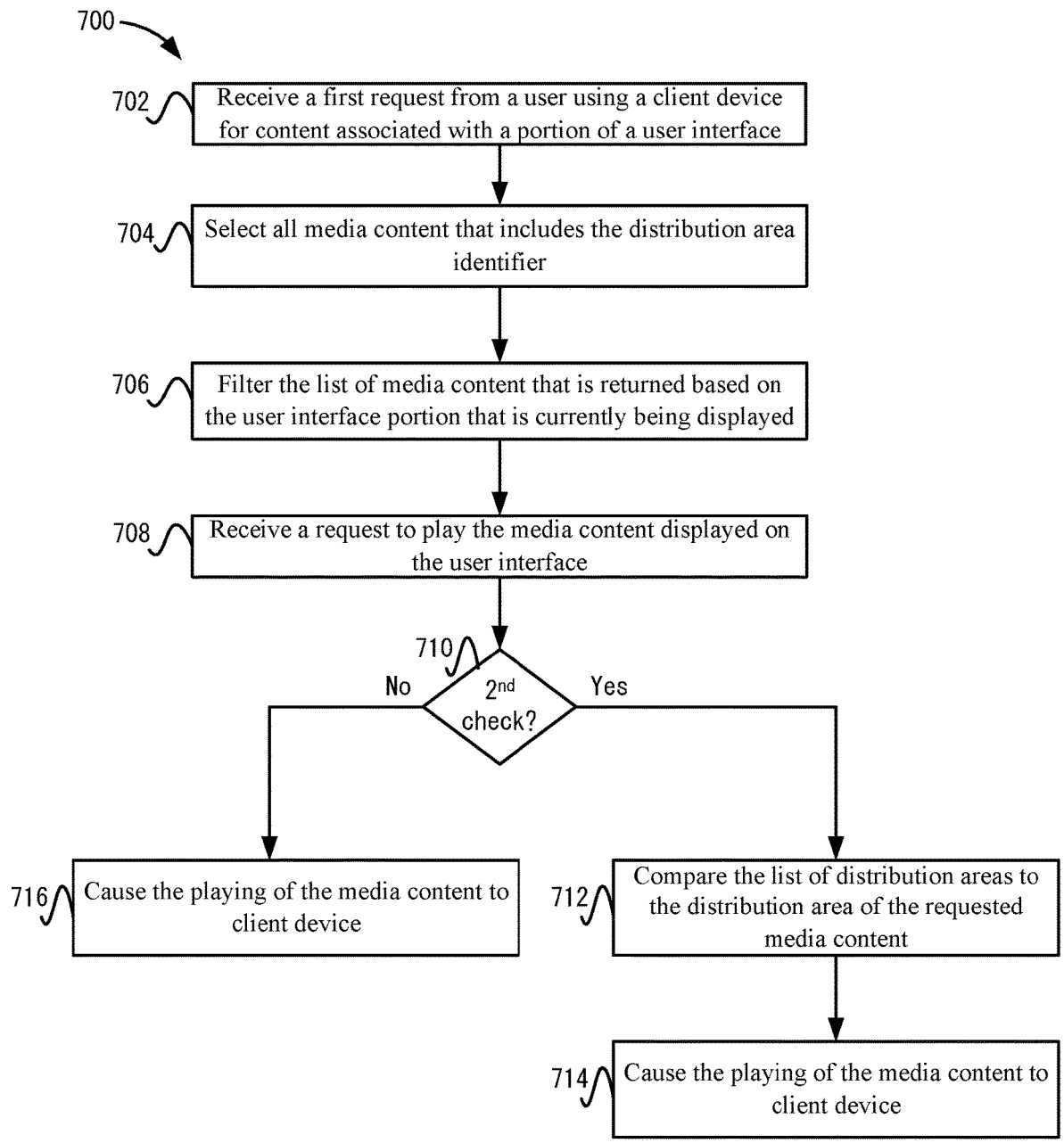
FIG. 7 depicts a simplified flowchart of a method for using distribution areas to determine available content according to one embodiment.

Then, the distribution areas are used to determine available media content. FIG. 7 depicts a simplified flowchart 700 of a method for using distribution areas to determine available content according to one embodiment. At 702, geo-mapping service 106 receives a first request from a user using client device 104 for content associated with a portion of a user interface. For example, the user may have navigated to a portion of the user interface, such as a comedy section of the user interface. The user interface may want to display the comedies available to that user. For example, only some comedies may be available at the user's current location.

Assuming the distribution area check has already been performed in FIG. 6, geo-mapping service 106 already has the list of distribution areas cached. This request may have been performed previously or may be performed in real-time when the request is received. At 704, geo-mapping service 106 selects all media content that includes the distribution area identifier. For example, content processor 110 may query content database 112 to retrieve every piece of media content that includes the distribution identifier. Then, at 706, geo-mapping service 106 may filter the list of media content that is returned based on the user interface portion that is currently being displayed. For example, geo-mapping service 106 may determine from the content metadata which media content are comedies. Video delivery system 102 may then return these comedies to client devices 104 for displaying in the user interface. This displays all comedies the user could possibly access.

At 708, geo-mapping service 106 receives a request to play the media content displayed on the user interface. Geo-mapping service 106 may then perform a second check to determine if the user can play the selected media content. The second check may be necessary because it is possible that media content displayed in the user interface may not be able to be played by the user for various reasons, such as the user may have changed location in between requests, or the media content may have been displayed for promotional reasons but may not be able to be played at this time by the user. The second check also ensures that no mistakes are made in allowing a user to play content that the user is not allowed to play. For example, the playing of content that is not allowed is a more serious problem for content providers than the display of the media content in a user interface.

At 710, geo-mapping service 106 determines if a second check of the available distribution areas for the current location of client device 104 for the user is needed. If so, at 712, geo-mapping service 106 compares the list of distribution areas to the distribution area of the requested media content. If the distribution area of the media content is included in the list of distribution areas, then geo-mapping service 106 indicates to video delivery system 102 that client device 104 can play the media content. At 714, video delivery system 102 may then cause the playing of the media content to client device 104. If a second check is not needed, then at 714, the media content is played immediately.

If the distribution area identifier of the media content is not included in the list of distribution areas, then at 716 geo-mapping service 106 outputs an indication that client device 104 cannot play this content. Accordingly, geo-mapping service 106 performs two different checks. Both checks reduce the number of queries that are needed. The first check to determine the available media content generates a small subset of distribution areas for the request. Then, that small subset can be used to query the content. Also, when a request for a specific piece of media content is received, the distribution area identifier for that piece of media content only needs to be compared to a small set of distribution areas for the client device 104 instead of the entire geo-location database. Accordingly, particular embodiments save storage and also query processing time.

Additionally, the structure of geo-location database 108 and content database 112 simplifies the ability to compare the distribution between pieces of media content and determine if the distribution has changed. For example, the video delivery service can determine that the distribution has changed for a piece of media content just by determining that the distribution area identifier has changed. Prior to this, a user would have to analyze a long list of ZIP codes or other geographic primitives to determine if distribution for that piece of media content changed. In this case, only a single distribution area identifier needs to be reviewed. Further, since the definition of a distribution area is immutable, the query responses can be cached and used for other users.

System

Figure 8:
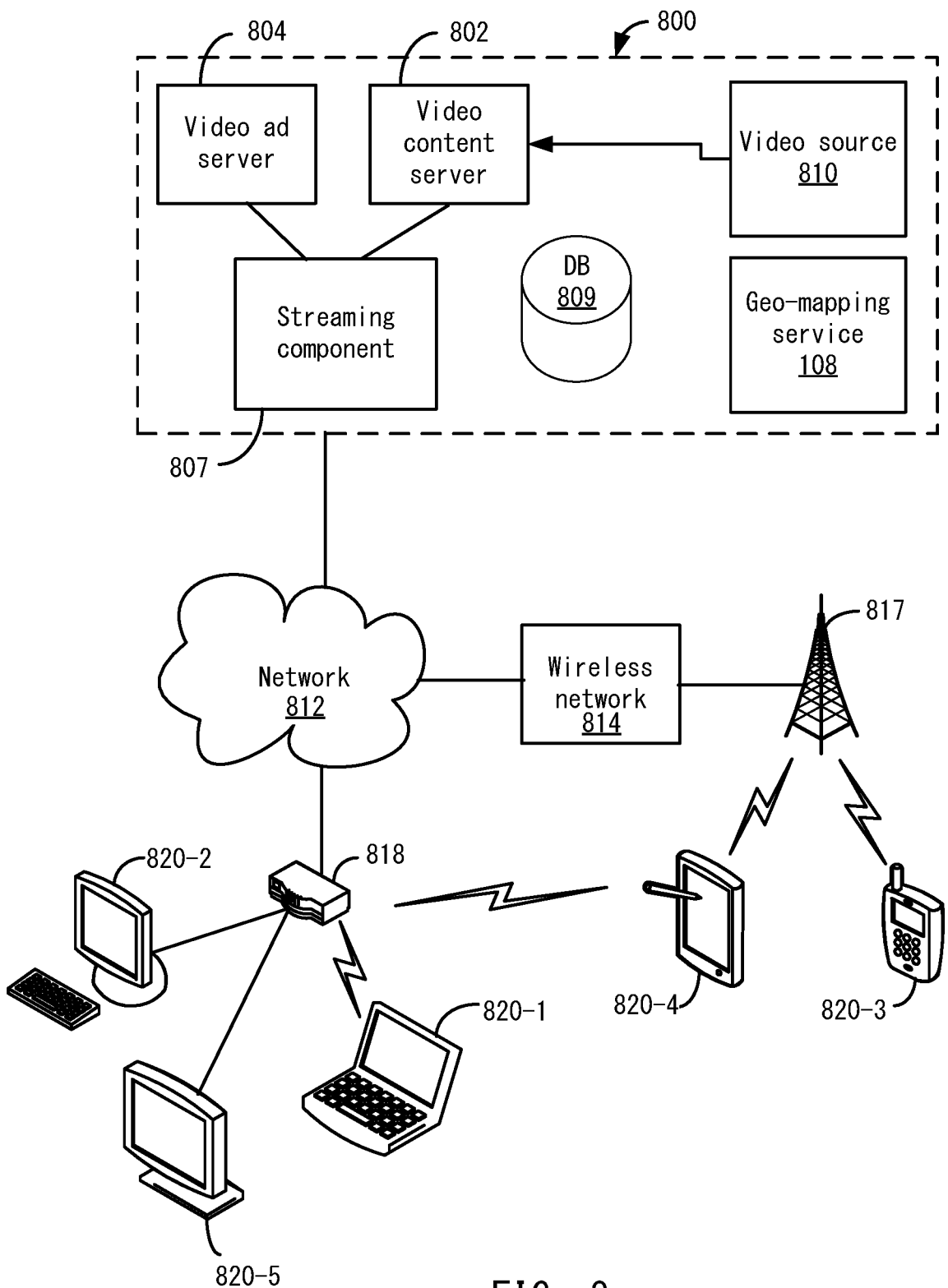
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include geo-mapping service 106.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or pieces not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
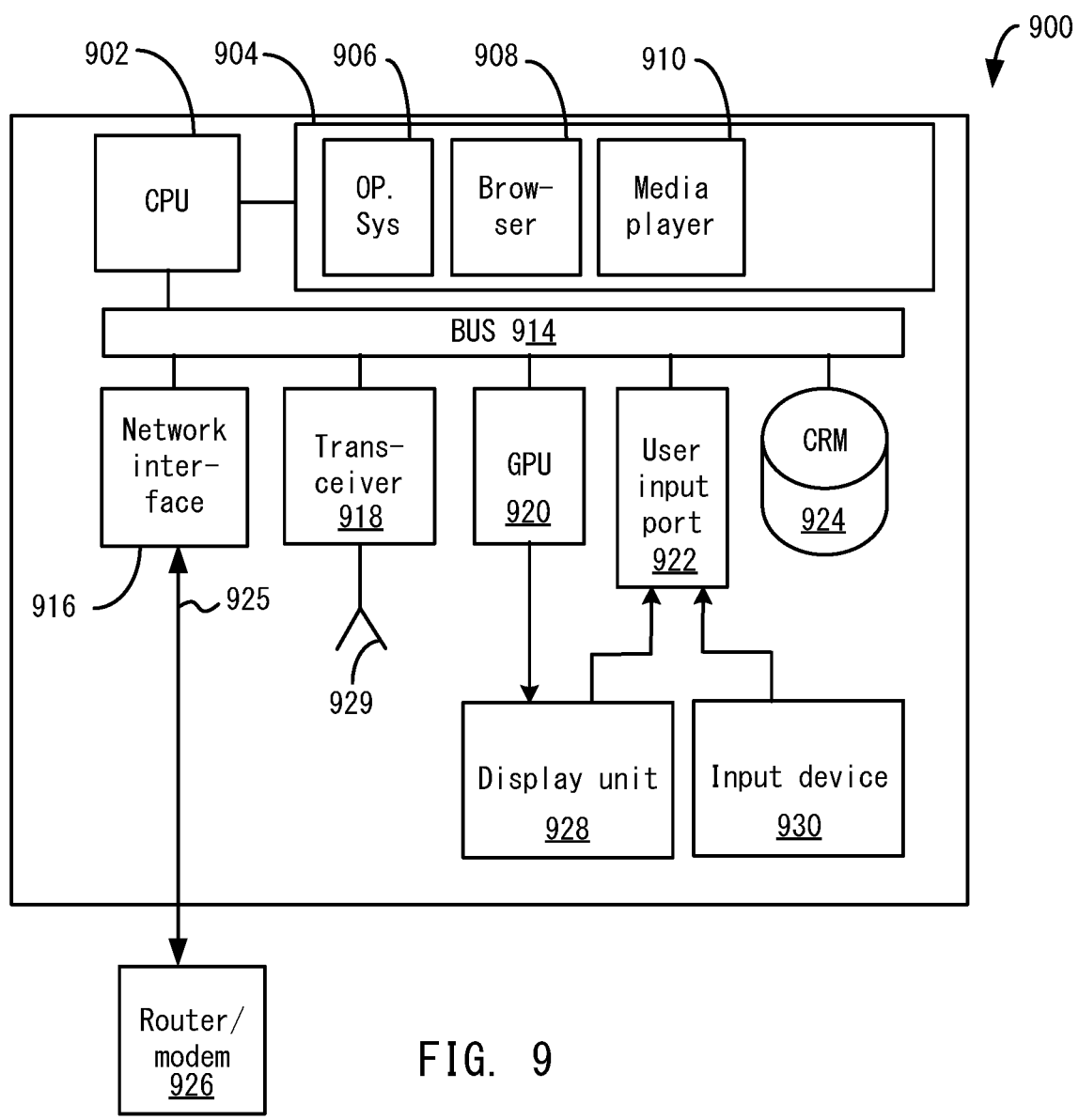
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing piece 920) to a display piece 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display piece 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, a plurality of distribution areas, wherein a distribution area is defined by one or more geographic primitives and associated with a distribution area identifier, and wherein a geographic primitive is defined by one or more location identifiers;
    storing, by the computing device, distribution area identifiers for the plurality of distribution areas in a first data structure;
    receiving, by the computing device, information for media content;
    generating, by the computing device, a content bundle for the media content based on the information for the media content, wherein the content bundle is associated with a distribution area identifier and metadata that describes characteristics of the media content; and
    storing, by the computing device, the content bundle in a second data structure, wherein a request with a location identifier is processed by accessing the first data structure to retrieve a set of distribution area identifiers that include a geographical primitive associated with the location identifier and then accessing the second data structure to select a set of content bundles that are associated with the set of distribution area identifiers.

2. The method of claim 1, wherein:
    a distribution area identifier is stored with an entry for each of the one or more geographic primitives.

3. The method of claim 2, wherein each entry for each of the one or more geographic primitives is stored in a row in the first data structure.

4. The method of claim 1, wherein storing the distribution area identifiers comprises:
    defining the distribution area identifiers as immutable in the first data structure.

5. The method of claim 4, further comprising:
    changing a definition of a geographic primitive for a distribution area identifier that is defined as immutable.

6. The method of claim 5, wherein changing the definition of the geographic primitive comprises:
    changing a geographic area encompassed by the geographic primitive.

7. The method of claim 1, wherein the content bundle is associated with only a single distribution area.

8. The method of claim 1, wherein the content bundle is associated with a plurality of distribution areas.

9. The method of claim 1, further comprising:
    determining the distribution area identifier for the content bundle based on the information for the media content.

10. The method of claim 1, wherein a single distribution area identifier is assigned to the content bundle in a single row in the second data structure.

11. The method of claim 1, wherein the request is received from a client device, the client device being associated with a location identifier, the method further comprising:
    providing information for the set of content bundles to the client device.

12. The method of claim 11, wherein accessing the first data structure reviews entries associated with the plurality of distribution areas in the first data structure to select any distribution areas that are associated the location identifier.

13. The method of claim 11, further comprising:
    receiving a second request to play the media content from the client device,
    re-determining a new location identifier for the client device;
    re-performing the accessing of the first data structure to retrieve a new set of distribution areas that include a geographical primitive associated with the new location identifier; and
    allowing the client device to play the media content if the new location identifier is associated with a distribution area for the media content.

14. The method of claim 1, further comprising:
    assigning a unique identifier to each of the plurality of distribution areas, wherein a new distribution area is created with a new unique identifier for any new combination of geographic primitives.

15. The method of claim 1, wherein:
    the second data structure stores content bundles for different media content, wherein each content bundle is associated with a distribution area identifier.

16. A non-transitory computer-readable storage medium containing instructions, that when executed, control a computer system to be operable for:

receiving a plurality of distribution areas, wherein a distribution area is defined by one or more geographic primitives and associated with a distribution area identifier, and wherein a geographic primitive is defined by one or more location identifiers;

storing distribution area identifiers for the plurality of distribution areas in a first data structure;

receiving information for media content;

generating a content bundle for the media content based on the information for the media content, wherein the content bundle is associated with a distribution area identifier and metadata that describes characteristics of the media content; and storing the content bundle in a second data structure, wherein a request with a location identifier is processed by accessing the first data structure to retrieve a set of distribution area identifiers that include a geographical primitive associated with the location identifier and then accessing the second data structure to select a set of content bundles that are associated with the set of distribution area identifiers.

17. The non-transitory computer-readable storage medium of claim 16, herein storing the distribution area identifiers comprises:

defining the distribution area identifiers as immutable in the first data structure.

18. The non-transitory computer-readable storage medium of claim 16, wherein content bundle is associated with only a single distribution area.

19. The non-transitory computer-readable storage medium of claim 16, wherein the request is received from a client device, the client device being associated with a location identifier, further operable for:

providing information for the set of content bundles to the client device.

20. An apparatus comprising:

one or more computer processors; and a computer-readable storage medium comprising instructions for controlling the one or more computer processors to be operable for:

receiving a plurality of distribution areas, wherein a distribution area is defined by one or more geographic primitives and associated with a distribution area identifier, and wherein a geographic primitive is defined by one or more location identifiers;

storing distribution area identifiers for the plurality of distribution areas in a first data structure;

receiving information for media content;

generating a content bundle for the media content based on the information for the media content, wherein the content bundle is associated with a distribution area identifier and metadata that describes characteristics of the media content; and storing the content bundle in a second data structure, wherein a request with a location identifier is processed by accessing the first data structure to retrieve a set of distribution area identifiers that include a geographical primitive associated with the location identifier and then accessing the second data structure to select a set of content bundles that are associated with the set of distribution area identifiers.

* * * * *